US006103000A

United States Patent [19]
Custer

[11] Patent Number: 6,103,000
[45] Date of Patent: Aug. 15, 2000

[54] POLYPHENOLIC SURFACTANT COMPOSITIONS AS UNIVERSAL BITUMEN/WATER EMULSIFIERS

[75] Inventor: Robert S. Custer, Corvalis, Oreg.

[73] Assignee: Saramco, Inc., Corvallis, Oreg.

[21] Appl. No.: 09/001,258

[22] Filed: Dec. 31, 1997

[51] Int. Cl.[7] .................................................. C09D 195/00
[52] U.S. Cl. ..................... 106/277; 106/232; 106/235; 106/283; 524/59; 524/74
[58] Field of Search ..................... 106/232, 235, 106/277, 283; 524/59, 74

[56] References Cited

U.S. PATENT DOCUMENTS

| | | | |
|---|---|---|---|
| 3,933,424 | 1/1976 | Falkehag et al. | 8/34 |
| 5,401,308 | 3/1995 | Shuey et al. | 106/273.1 |
| 5,407,476 | 4/1995 | Shuey et al. | 106/216 |
| 5,578,118 | 11/1996 | Shuey et al. | 106/217.6 |
| 5,650,000 | 7/1997 | Shuey et al. | 106/217.8 |

OTHER PUBLICATIONS

Derwent Abstract 1994–142753, "Plugging solution . . . ", 1994.

*Primary Examiner*—David Brunsman
*Attorney, Agent, or Firm*—Heller Ehrman White & McAuliffe; Jacques M. Dulin; Robert F. Dennis

[57] ABSTRACT

The invention relates to an improved surfactant mixture which permits use of lower concentrations of polyphenolics including natural vegetable polyphenolic extracts and/or synthetic phenolic resins to produce stable anionic slow-setting asphalt-in-water emulsion compositions suitable for use as pavement sealers and coatings. The polyphenolics are selected from natural vegetable polyphenolic extracts including Chestnut A, Chestnut N and Sumac-K10; or from synthetic phenolic resins including phenol-formaldehyde, resorcinol-formaldehyde and novolak resins; or mixtures thereof; in amounts of about 0.1% to 10% polyphenolics in the final emulsion, to form and stabilize the emulsion. The emulsions employ a surfactant mixture comprising a non-ionic surfactant with a hydrophilic/lipophilic balance index of from about 16 to about 20, and an anionic lignin sulfonate, in amounts of about 0.1% to 3.0% surfactant mixture in the final emulsion. Optionally 0.02% to 2.00% w/w of sodium borate decahydrate may be included. The pH may be adjusted from pH 4.5 to pH 12.5. The emulsions produced using these components dry and cure faster and yield residual asphalt having higher viscosity, high ionic headroom, a higher softening temperature, greater ductility, increased adhesion and increased cohesive strength as compared to existing asphalt-in-water emulsions. The phenolic elements of the composition act as universal emulsifiers in that they are effective over a wide range of pH values and are effective for use with a variety of particulate and fiber filler materials.

4 Claims, 1 Drawing Sheet

POLYPHENOLIC SURFACTANT COMPOSITIONS AS UNIVERSAL BITUMEN/WATER EMULSIFIERS

CROSS REFERENCE TO RELATED CASES

This Application is a based on two previously filed Provisional Applications of the same title and by the same Inventor: application Ser. No. 60/035,727, filed Jan. 2, 1997, and application Ser. No. 60/036,870, filed Feb. 5, 1997. Applicant hereby claims the priority of these earlier filed Provisional Applications pursuant to 35 U.S.C. §119(e).

TECHNICAL FIELD

The invention relates to the field of emulsion compositions and more particularly to an improved surfactant mixture which permits use of lower concentrations of polyphenolics including natural vegetable polyphenolic extracts and/or synthetic phenolic resins (phenol-formaldehyde, resorcinol-formaldehyde and novolak resins) to produce stable anionic slow-setting asphalt-in-water emulsion compositions suitable for use as pavement sealers and coatings. The emulsions, of the invention dry and cure faster and yield residual asphalt having higher viscosity, a higher softening temperature, greater ductility, increased adhesion and increased cohesive strength as compared to asphalt-in-water emulsions without the polyphenolics of the inventive composition.

BACKGROUND

Asphalt-in-water emulsion compositions are widely used as pavement sealers and coatings. The use of natural vegetable polyphenolic extracts (NVPE) as an emulsifier component to prepare stable, slow-setting, anionic, asphalt-in-water emulsions is disclosed in the related U.S. Pat. No. 5,407,476, entitled Quebracho/Surfactant Compositions as Universal Bitumen/Water Emulsifiers, and in the related U.S. Pat. No. 5,650,000 entitled Polyphenolic Vegetable Extract/Surfactant Compositions as Universal Bitumen/Water Emulsions, the disclosures of both of which are hereby incorporated by reference herein to the extent needed. These patents disclose the use of quebracho and other NVPE in conjunction with an anionic surfactant selected from the group consisting essentially of the salts of alpha olefin sulfonates, alkyl aryl sulfonates, and mixtures thereof. The emulsions produced thereby dry faster and yield residual asphalt having higher viscosity, a higher softening temperature, greater ductility, faster curing time, increased adhesion and increased cohesive strength as compared to existing asphalt-in-water emulsions.

SUMMARY OF THE INVENTION

It is among the objects of this invention to provide an improved emulsifier containing a natural vegetable polyphenolic-containing extract (NVPE) such as Quebracho, Chestnut A, Chestnut N, Sumac-K10 and combinations thereof as well as emulsifiers containing artificially produced or synthetic phenolic resins (SPR), such as phenol formaldehyde resins, resorcinol formaldehyde resins, novolaks, and combinations thereof, as well as emulsifiers containing both NVPE and SPR for producing stable slow-setting anionic asphalt-in-water emulsions exhibiting enhanced properties including faster drying, emulsion stability upon the addition of filler materials, an asphalt residue from such emulsion having greater resistance to abrasion, higher viscosity, increased adhesion to substrates, higher softening point, increased cohesive strength and increased ductility as compared to asphalt-in-water emulsions not containing such materials.

It is another object of this invention to provide an improved emulsifier containing NVPE which permits the production of stable slow-setting anionic asphalt-in-water emulsions with the above described enhanced properties using smaller proportions of NVPE than in the prior art, and which reduction is effected by use of special surfactant mixtures of nonionic and anionic surfactants.

It is another object of this invention to provide an emulsifier with the above described enhanced properties containing synthetic substitutes for NVPE whose supply is predictable and which permits the production of stable slow-setting anionic asphalt-in-water emulsions using materials not as subject to variations in crop yields and other vagaries of agricultural raw materials as NVPE.

It is another object of this invention to provide a method of use of an emulsifier containing either or both artificial polyphenolic compounds and natural polyphenolic extracts, for addition to asphalt to provide asphalt-in-water emulsions.

It is another object of this invention to provide a method of making an asphalt-in water emulsion with an emulsifier containing either or both artificially produced polyphenolic compounds and natural polyphenolic extracts.

Still other objects, features, aspects and advantages of the present invention will become apparent from the following Summary, Detailed Description and claims of the present invention, when taken in conjunction with the accompanying drawing.

The following definitions of terms, their abbreviations and intended meanings are used in describing the compositions and methods of this invention:

NVPE refers to the natural wood and bark extract of several trees of various genera that are high in polyphenolic-containing extracts, including as principal components, tannin and related compounds, namely: Chestnut A and Chestnut N from the genus Castanea and other genera of the Order which it is a member, Sumac-K10 from Hrhus coriaria, and Quebracho (defined below). The Chestnut is in the Order Fugales, other well known members of which include, beside the genus Castanea (Chestnut), the genus Betula (birch), Fagus (beech) and Quercus (oak). The genus Castanea is native to the Northern Hemisphere and includes: the American Chestnut, C. dentata; the European (Italian) Chestnut, C. sativa; the Chinese Chestnut, C. molissima and the Japanese, C. crenata.

Quebracho ("Q") refers to the wood and bark extract of any number of South American trees of different genera of the order Sapindales. The main components are aspidospermine, tannin, tannic acid, and quebrachine. The two principle grades of Quebracho include crude Quebracho ("Q", same as Quebracho), and bisulfite-treated or refined Quebracho ("RQ").

Bitumen ("B") refers to any thermoplastic, naturally occurring or catalytically obtained substance having a dark to black color consisting almost entirely of carbon and hydrogen, with some nitrogen, sulfur, and oxygen. The term is intended to include heavy oils, tars, pitch, asphalt, and asphaltines.

Asphalt ("AS") refers to any of the varieties of naturally occurring and petroleum-derived bitumens of varying molecular weights from about 400 to above 5000, and composed of hydrocarbons and heterocyclics containing nitrogen, sulfur, and oxygen.

Caustic ("C") refers to any number of alkaline, alkaline-earth or ammonium salt compounds having broadly basic properties, that is, a compound that readily ionizes in aqueous solution so that the pH is high (above 7) and includes alkaline and alkaline-earth hydroxides, sodium carbonate, bicarbonate of soda, water glass (sodium metasilicate), Nahcolite, trona, sesquicarbonate, ammonium hydroxide, ammonium carbonate, ammonia (gas or solution), or any other suitable base.

Surfactant ("SA") refers in general to any substance that, even though present in small amounts, migrates to the interface between two phases and exerts a great effect on the surface energy of the liquid or solid surfaces. In the description of improved emusifier compositions of this invention, the term surfactant ("SA") includes nonionic surfactants with a hydrophilic/lipophilic balance index of between approximately 16 and 20, such as Surfonic NB-577, and lignin sulfonates, such as Marasperse N-22, and mixtures thereof.

SPR refers to artificial or synthetic phenolic resins including phenol-formaldehyde resins, resorcinol-formaldehyde resins, novolak resins and mixtures thereof PPS (polyphenolic substance) refers to NVPE, SPR and mixtures thereof ASTM refers to standards set forth by the American Society for Testing and Materials, and more particularly to the ASTM D977 Standard Specifications for Emulsified Asphalt.

HLB or HLB number refers to the hydrophilic/lipophilic balance index. This is a known system that assigns numbers to emulsifiers and also to materials that require emulsification (oils, esters, fatty acids, etc.). When trying to emulsify any given material, an emulsifier or combination of emulsifiers is chosen with the same HLB as the material to be emulsified.

It has been discovered that emulsifying compositions which include from about 0.1% to about 3.0% of a surfactant mixture (weight % of total emulsion) comprising a nonionic surfactant with a hydrophilic/lipophilic balance index ("HLB") of from about 16 to about 20, and an anionic lignin sulfonate, permits the production of a stable slow setting anionic emulsifying composition using far smaller amounts of NVPE than shown in the prior patent work, with the lower end of the range of NVPE in the composition reduced to about 0.1%. This invention permits an expanded range of from about 0.1% to about 10% w/w (weight % of total emulsion) polyphenolics (synthetic polyphenolic resin, NVPE, or mixtures thereof) to produce a stable slow setting anionic emulsifying composition.

The forgoing is a significant reduction in the quantity of polyphenolic required to achieve a stable anionic emulsion when mixed with a bitumen as compared to the polyphenolic qualities disclosed in the related patents. The lower limit of the range for the NVPE in the emulsifying solution of this invention is reduced from 2.0% in the original patent work to about 0.1% due to the effectiveness of the surfactant mixture of this invention.

The expanded range of feasible NVPE compositions increases the flexibility and economy of use of such compositions. It has also been discovered that an NVPE mixture of about 25% Quebracho and about 75% Chestnut A (sweet chestnut) gives improved results when used in combination with the above described surfactant mixture For convenience, this composition of NVPE is referred to herein as Q/CPE.

It has also been discovered that, in addition to the NVPE, phenol-formaldehyde (PF) resin is also effective in producing stable anionic slow setting asphalt-in-water emulsions. PF resins have the general chemical formula of $(C_6H_6O$—$CH_2O)_x$.$xNa$ and are soluble in alkaline solutions. A common phenol-formaldehyde (PF) resin is GP®6777 as manufactured by Georgia-Pacific Resins, Inc. PF resins, being synthetically manufactured, are not as subject to variations in crop/yields and other vagaries of agricultural raw materials. PF resins represent a synthesized, predicably supplied alternative to the NVPE.

Further, it has been discovered that resorcinol-formaldehyde (RF) resins and novolaks may also be used in place on NVPE in the emulsion system of this invention to improve emulsion stability. Novolaks, such as GP® Novolak also manufactured by Georgia-Pacific Resins, are phenol-formaldehyde resins "endcapped" with phenol groups so they do not continue to polymerize thereby greatly increasing shelf life and providing 20% to 30% more phenol groups per unit weight compared with regular PF resins.

It has also been found that the optional addition of 0.02% to 2.00% w/w (weight % of total emulsion) of sodium borate decahydrate to the emulsifying solution improves the stability of the asphalt emulsions made from these polyphenolic-containing emulsifiers. Thus, in summary, the improved emulsifying compositions of the present invention are directed to emulsifying compositions which include from about 0.1% to about 3.0% of a surfactant mixture compound (weight % of total emulsion), comprising a nonionic surfactant with a HLB index of from about 16 to about 20, an anionic lignin sulfonate surfactant, and from about 0.1 to about 10% (weight % of total emulsion) of a polyphenolic substance (PPS) (SPR including PF, RF and Novolak resins; NVPE including Quebracho and Chestnut A; and mixtures thereof) to produce a stable slow-setting anionic emulsifying composition. A suitable commercially available anionic lignin sulfonate surfactant is Marasperse N-22 as manufactured by Ligno Tech, U.S.A, and a suitable commercially available nonionic surfactant is Surfonic NB-557, manufactured by Huntsman Corporation, which is a 55 mole ethoxylate of nonylphenol with a HLB index of 18.3. The range of nonionic to anionic surfactant in the surfactant mixture is from about 1:4 to about 4:1.

The PPS by itself is not an effective asphalt emulsifier. However, when used in combination with a suitable surfactant, a very stable emulsion of asphalt-in-water may be produced that is so stable and long lasting that it can be loaded with fine particulate fillers to form stable anionic slow-setting emulsions suitable as pavement sealer compositions. The amount of PPS and surfactant mixture required to obtain a stable emulsion will vary depending upon a number of factors, including the particular asphalt used, the nature of any additives in the asphalt, the nature and amount of particles or fibers to be added to the asphalt emulsion, temperature, and the nature of the substrate.

The composition for an aqueous emulsifying solution ("soap solution") is thus approximately:

a) 0.1% to 10.0% by dry weight of PPS (NVPE and/or SPR);

b) 0.1% to 3.0% by active weight of nonionic/anionic surfactant mixture, in the range of from about 1:4 to about 4:1 nonionic to anionic;

c) the above dissolved in water to make 100%;

d) optionally, alkali sufficient (if needed) to adjust the pH of the emulsifying solutions to a value in the range from 4.5 to 12.5; and e) optionally, 0.02% to 2.00% w/w of sodium borate decahydrate may be included.

Note that the percentage ranges above are based on the total weight of the final emulsion. The percentage limits based on the weight of the aqueous phase only ("soap" solution) will be correspondingly higher depending on the ratio of aqueous dispersion phase to asphalt dispersed phase in the final emulsion. Typical pavement sealer emulsions are about 40% soap solution/60% asphalt.

The method of use of NVPE in making emulsifier compositions for asphalt-in-water emulsions also applies generally to the use of synthetic polyphenolic resins (SPR) in such emulsifier compositions. In the discussion below, the general term polyphenolic substance (PPS) will be used as defined above, except when specific material properties are relevant.

The adjustment of pH by the addition of alkali or caustic will depend on the specific PPS and surfactants selected for use, the amounts thereof, and the desired final emulsion pH for a particular application. The final pH of the asphalt-in-water emulsion may be between 4.5–12.5. The emulsion may still be anionic even with a pH less than 7 when the charge of the emulsion is negative. Anionic emulsions of this invention have been produced with an emulsion pH of 4.5. The pH is generally adjusted when novolak resins, such as GP Novolak, are used. Maintaining a high pH during processing, preferably about 12, assists in preventing precipitation of the Novolak resin and stabilizes both the "soap" solution and the emulsion.

The selected mixture of PPS (NVPE and/or SPR) and surfactant can conveniently be made as a simple dry blend, or it may be made as a concentrated solution. The pH adjusting reagent, if needed, may be included with the dry blend or may be added separately by the user.

The PPS required for emulsification may be introduced either directly into the asphalt or into the emulsifier solution. In the event that the NVPE is added directly to the asphalt in appropriate quantity, only an aqueous emulsifier solution containing the surfactant and the pH adjustment reagent (and optionally, the borate) need be prepared, to be later added to the NVPE/asphalt composition, in order to produce the asphalt-in-water emulsion. This may simplify operations when an asphalt manufacturer has opted to treat the asphalt directly with PPS as an additive to obtain the benefits of greater adhesion, higher softening point, higher viscosity, greater cohesive strength, increased hardness, more rapid drying, etc.

The NVPE used may be any of its normally available commercial forms. The crude lump NVPE should be ground to a fine particle size to permit it to be easily solubilized in the surfactant soap solution. In ground form NVPE is typically a tannish-brown, reddish-brown or maroon colored powder. Alternately, unground lump NVPE may be added directly to hot asphalt. The contained moisture in the NVPE will be driven off, creating a mechanical agitation or turbulence that will assist in the break up of lumps and dispersion of the NVPE throughout the hot asphalt. The lump material can sink to the bottom, however, and in that case it is necessary to provide some additional agitation to break up the lumps and disperse all of the NVPE into the hot asphalt.

All of the common grades of Quebracho contain water: crude lump typically contains 18–20% water, crude spray-dried typically contains 5–6% water, and spray-dried refined typically contains 5–8% water. Quebracho as a natural product is a well characterized and consistent source of the polyphenolic component used in the emulsifier compositions of this invention. Crude Quebracho is not fully soluble in cold water unless the water is adjusted to pH above about 8.5. However, the crude material will dissolve slowly at water temperatures above about 120° F. The refined spray-dried Quebracho results from treatment of the crude Quebracho with sodium bisulfite and is fully soluble in cold water, creating an acidic solution.

SPR and also nonionic and anionic surfactants may be supplied by manufacturers as aqueous solutions. In this case the water content of the SPR or surfactant solution is considered in determining the amount of water to be added to complete the "soap" solution.

The hydrophilic/lipophilic balance index (HLB) may be used in selecting the particular nonionic surfactant(s) for use in the emulsifier of this invention (a mixture of more than one nonionic surfactant may also be used). When emulsifying mixtures of materials or using mixtures of emulsifiers, the HLB of the mixture is obtained from the HLB of the individual components, weighting the HLB contribution of the component by the component proportion in the mixture. For example, the HLB of a mixture of 70% of a mineral spirits with HLB 14, and 30% of a mineral spirits with HLB of 10 is 12.8, calculated as follows: (0.7×14)+(0.3×10)=9.8+3.0=12.8. This would be approximately equivalent in HLB to another mixture of, for example, 20% of a material of HLB 4.7 and 80% of a material of HLB 14.9. Another property that can be stated in terms of HLB is water solubility, Generally, surfactants with HLB below 6 are water insoluble; an HLB of 6–10 indicates a water dispersible surfactant; and HLB above 10 indicates water solubility, particularly for an HLB of 13 or higher.

The HLB system is not an absolute system, but rather is to be used as a method for reducing the amount of experimentation required to obtain a good emulsion. As a result of using the HLB system, a good emulsion can be produced without undue experimentation.

The HLB of nonyl phenol ethoxylates, such as Surfonic NB-577, is a function of the ratio number of moles of ethylene oxide per mole of nonyl phenol as shown in Table A below. Surfonic NB-577 has a ratio of 1:55 and an HLB of 18.3.

TABLE A

| Molar ratio | HLB |
|---|---|
| 1:1 | 3.4 |
| 1:4 | 8.9 |
| 1:30 | 17.1 |
| 1:55 | 18.3 |
| 1:100 | 19.0 |

BRIEF DESCRIPTION OF THE DRAWING

The invention is illustrated by reference to the drawing, in which.

DETAILED DESCRIPTION OF THE BEST MODE

Figure 1:
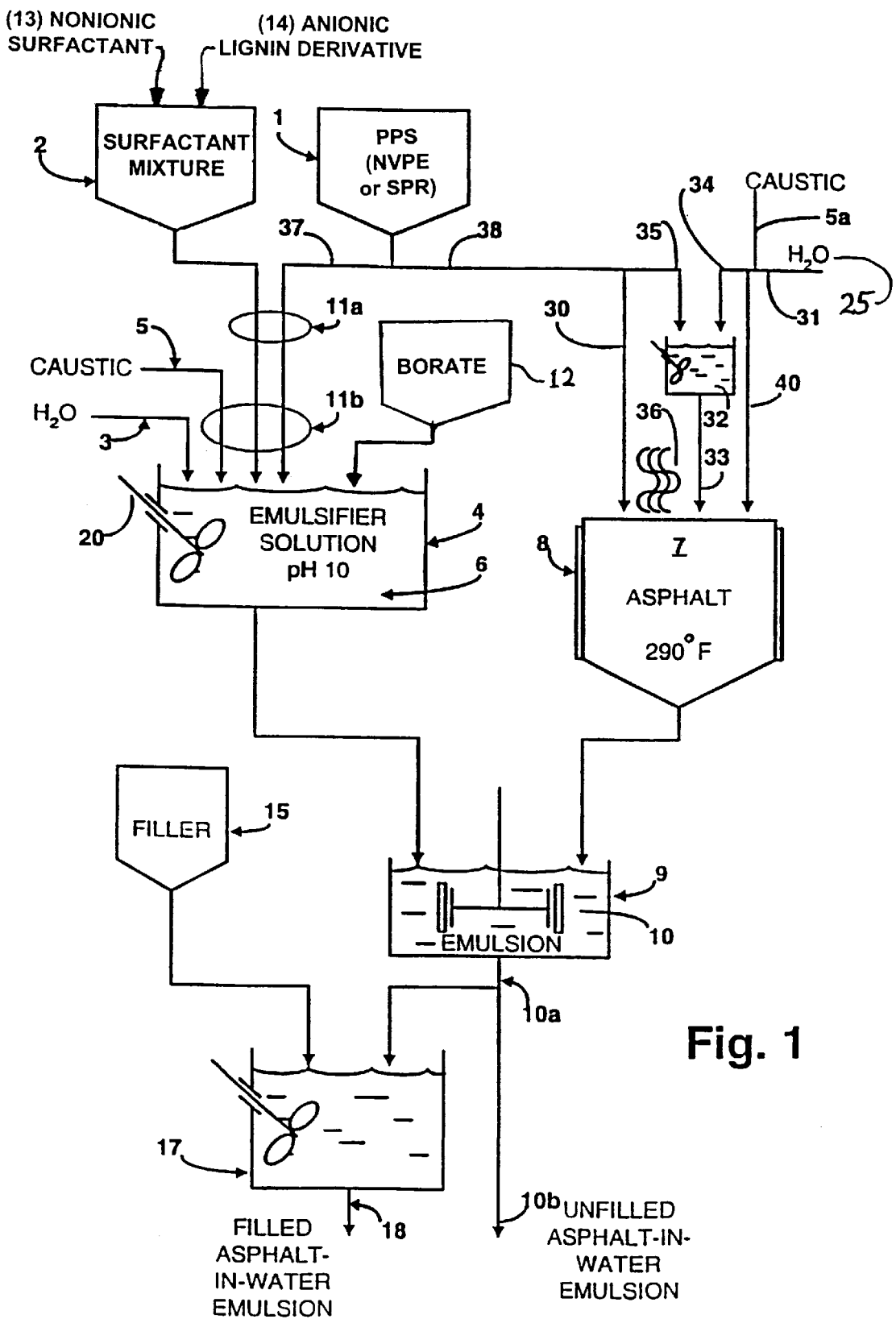
FIG. 1 shows a process flow diagram of the alternate preferred methods of making PPS containing emulsifier solutions and asphalt-in-water emulsions of this invention.

The following detailed description illustrates the invention by way of example, not by way of limitation of the principles of the invention. This description will clearly enable one skilled in the art to make and use the invention, and describes several procedural embodiments, procedural adaptations, variations, alternatives and uses of the invention, including what I presently believe is the best mode of carrying out the invention. In this regard, the best mode of the invention is taught with reference to the several tables of test data, and is of sufficient complexity that the many aspects, interrelationships, and sub-compositions thereof simply cannot be fully illustrated in a single example. Thus, one aspect of the best mode embodiment may be illustrated by means of one example and another aspect of the best mode embodiment may be illustrated by means of another example.

The asphalt in water emulsification process is shown in FIG. 1. In the preferred process for making a slow setting anionic asphalt in water emulsion, PPS (eg., dry powdered crude NVPE, such as Quebracho, or synthetic polyphenolic resin, or mixtures thereof) 1 is combined with the surfactant mixture 2 (the anionic and nonionic surfactants may be pre-mixed or may added separately as shown at 13 and 14) and water 3 (and optionally borate 12) in a mixing vessel 4. The PPS 1 is added at a rate of between 0.1%–10.0% dry weight to water and the surfactant mixture is added at a rate of 0.1%–3.0% dry weight to water. Sufficient caustic 5, if needed, is added to adjust the pH to between 8.5 and 12.5, preferably about 10. A mixer 20 ensures thorough dissolution of the PPS into the emulsifier solution 6.

Asphalt 7, heated to approximately 290° F., is maintained at that temperature in a vessel 8 in order to reduce its viscosity to facilitate handling and mixing. The heated asphalt is transferred from vessel 8 and combined with the emulsifier solution 6 in a shearing or colloid mill 9 in the ratio of 20%–60% w/w emulsifier solution to 80%–40% w/w asphalt, preferably about 40% w/w emulsifier solution to about 60% w/w asphalt. The asphalt in water mixture is milled until an emulsion 10 is formed.

The preferred emulsifying composition (6, 11a, 11b) may be prepared as a premixed dry powder by dry blending the selected grade or type of PPS and solid granular (powdered) surfactant mixture in the above ratios to obtain a dry, stable emulsifier blend 11a. An alternate preferred method is to add the caustic 5 in the dry blend 11a in the ratio needed to produce a dry anionic emulsifier blend, 11b. The caustic may be sodium hydroxide, sodium carbonate, potassium hydroxide, or any other suitable caustic in granular, bead, or flake form for the powdered premixed anionic emulsifier composition 11b.

Alternatively, all the emulsification components may be added separately to the water 3 in the preparation of the emulsifier solution 6. In this case, either a solution or solid form of the surfactant mixture 2 may be used. Fillers 15 may be combined with the asphalt-in-water emulsion 10 in a mixer 17 to produce a filled asphalt-in-water emulsion product 18 suitable for use as a pavement sealer. As compared to other emulsifiers, surprisingly the PPS/surfactant mixture emulsifier composition of this invention produces a strong enough anionic emulsion that additional quantities of an emulsifying agent are not required in order to prepare a stable filled asphalt in water emulsion. That is, the pH-adjusted, PPS/surfactant mixture emulsifier composition has enough emulsification capacity (ionic surplus or headroom) to prevent the asphalt/water emulsion from breaking when fillers are added. This vastly simplifies processing, as the resultant asphalt-in-water emulsion 10 of this invention is, in that sense, universal. It can be used straight, or with a wide variety of fillers, even fillers having a high fines content.

Alternately, as seen in the upper right of FIG. 1, PPS may be introduced, directly into the asphalt via lines 38 and 30. Caustic may be introduced directly to the asphalt, either alone or with water, via lines 34 and 40 in order to improve the dissolution of the NVPE/SPR in the asphalt. Alternately, the PPS 35 may be predissolved in tank 32 in water 31 and then added from tank 32 as a water solution 33, pH adjusted if necessary with caustic for complete solubility. The solution of PPS, or pH-adjusted PPS, 33, can be added directly to the asphalt This addition of a solution to the hot asphalt results in the boil off of the moisture 36 leaving an intimate mixture of the PPS with the asphalt. The PPS/asphalt mixture 7 is not an emulsion. This mixture is emulsified by further processing in mill 9 as described above with an emulsifier surfactant/caustic solution from tank 4. In this case, PPS need not be added via line 37 to the solution 6 as it is already contained in the asphalt/PPS mixture in tank 8. However, if desired, the PPS addition can be split, i.e., some of the PPS may be introduced into the ultimate asphalt-in-water emulsion products 10b or 18 via line 37 and emulsifier solution 6, and the rest added directly into asphalt 7 via lines 38, 30 and/or lines 35, 33.

The following examples are of test data showing the performance and characteristics of this invention. For each numbered example there is a similarly numbered table listing emulsion components and test results per the ASTM D977 Standard Specifications for Emulsified Asphalt. As a reference point, with each example is shown test data for a prior art emulsifier composition, Indulin SA-L. Indulin SA-L is a commonly used commercial anionic slow-setting emulsifier manufactured by Westvaco Corporation. Also, Table 1B below provides a reference from prior patent work to show the improvements obtained with the current invention.

Examples 1 and 2 show compositions that employ a NVPE mixture, Q/CPE, which comprises approximately 25% Quebracho and approximately 75% Chestnut A, with total emusifier solids of 1.0% and 0.8% respectively Example 3 employs GP 6777, a phenol-formaldehyde resin, and Example 4 employs GP® Novolak. Each of the examples employ a nonionic (HLB 16–20)/anionic surfactant mixture of Marasperse N-22 as manufactured by Ligno Tech, U.S.A and Surfonic NB-557 (70% active), manufactured by Huntsman Corporation.

In each of Tables 1–5, the quantities of emulsion components listed are the weight % of the total emulsion. Where particular components of the emulsions are added as commercially available aqueous solutions the whole solution quantity is shown in a footnote, and only the quantity of the constituent "solids" or solute portion is separately listed in the respective table, the water solvent portion being included in the water quantity of the "soap" solution. The quantity "Total Emulsifier Solids" includes only the non-aqueous portion of these solutions. The term "soap solution" is used to denote the emulsifier and aqueous components of the emulsion prior to combining and milling with the asphalt. The units in the test results refer to those of the particular ASTM D977 specification.

EXAMPLE 1

Q/CPE with Surfactant Mixture—1.0% Emulsifier

The emulsifier was prepared in the manner described above by mixing NVPE, Marasperse and Surfonic NB-557 with water, mixing until dissolved, and adjusting the pH to about 10 with bead NaOH to form a pH-adjusted emulsifier soap solution. The emulsifier solution and asphalt were combined in a colloid mill to produce a bituminous emulsion.

The NVPE portion totals 0.412% of the emulsion and the surfactant solids total 0.488% for a total emulsifier solids content of 1% of the final emulsion, as shown in Table 1A below.

The ratio of Marasperse to Surfonic NB-557 solids is approximately 0.53:1. The total soap solution is 38.1% and the asphalt is 61.9% of the total emulsion, with caustic added to yield a final pH of 10.3.

TABLE 1A

Example 1 (Q/CPE with Surfactant Mixture - 1.0% emulsifier)

| Emulsion Components | | Indulin SA-L | Example 1 |
|---|---|---|---|
| Indulin SA-L Solids[a] | | 1.0% | |
| Marasperse N-22 | | | 0.170% |
| Surfonic NB-557 Solids[b] | | | 0.318% |
| Refined Quebracho | | | 0.128% |
| Sweet Chestnut A | | | 0.384% |
| Total Emulsifier Solids | | 1.0% | 1.000% |
| NaOH | | | 0.065% |
| Water | | 36.2% | 37.035% |
| Total "Soap" Solution | | 37.2% | 38.100% |
| Asphalt | | 62.8% | 61.900% |
| Total Emulsion | | 100% | 100% |
| Tests and Specifications | ASTM D977 | Emulsion Results | |
| Avg. Residue % | 57% min | 62.8%% | 61.90% |
| Cement Mixing % | 2.00% max | 0.29% | 0.02% |
| Sieve Test, % | 0.10% max | 0.01% | 0.01% |
| 24 Hour Stability, % | 1.0% max | 0.22% | −0.07% |
| Viscosity @ 25 C., SFS | 20 to 100 | 39 | 41 |
| Final pH of soap solution | | 10.60 | 10.09 |

[a]2.5% as aqueous solution.
[b]0.455% as aqueous solution.

The test results show a cement mixing of 0.02% contrasted with 0.29% for the Indulin reference. The cement mixing test measures the stability of the emulsion in the presence of fillers of high fines content, an very important property for slow-setting pavement sealers, and the ASTM specifications require no greater than 2% (lower is preferred). The 24 hour stability is also improved, being −0.07% contrasted with 0.22%. This example is an across-the-board improvement over the Indulin SA-L (i.e. it has lower value for cement mixing and stability and an equal value for sieve). Accordingly, this represents a preferred composition.

Table 1B below shows a comparison of the emulsifier composition of Example 1 of this invention with an comparable emulsifier composition disclosed in our prior U.S. Pat. No. 5,650,000, which is referenced as Example 3 in said patent. This emulsifier composition employed a commercially available $C_{14}$–$C_{16}$ alpha olefin sulfonate surfactant, Bio-Terge AS-90 Beads manufactured by Stepan Chemical Company, and was prepared in essentially the same manner. This surfactant has a HLB of 20, and was not used in combination with other surfactants.

TABLE 1B

Example 1 (Q/CPE) compared with prior patent NVPE emulsifier

| Emulsion Components | Prior patent | Example 1 |
|---|---|---|
| Bio-Terge AS-90 beads - alpha olefin sulfonate | 0.4% | |
| Marasperse N-22 | | 0.170% |
| Surfonic NB-557 Solids[b] | | 0.318% |
| Refined Quebracho | 2.6% | 0.128% |

TABLE 1B-continued

Example 1 (Q/CPE) compared with prior patent NVPE emulsifier

| | | | |
|---|---|---|---|
| Sweet Chestnut A | | | 0.384% |
| Total Emulsifier Solids | | 3.0% | 1.000% |
| NaOH | | 0.3% | 0.065% |
| Water | | 35.7% | 37.035% |
| Total "Soap" Solution | | 39.0% | 38.100% |
| Asphalt | | 61.0% | 61.900% |
| Total Emulsion | | 100% | 100% |
| Tests and Specifications | ASTM D977 | Emulsion Results | |
| Avg. Residue % | 57% min | 60.0%% | 61.90% |
| Cement Mixing % | 2.00% max | 1.84% | 0.02% |
| Sieve Test, % | 0.10% max | 0.00% | 0.01% |
| 24 Hour Stability, % | 1.0% max | — | −0.07% |
| Viscosity @ 25 C., SFS | 20 to 100 | 32 | 41 |
| Final pH of soap solution | | 10.0 | 10.09 |

[b]0.455% as aqueous solution.

The results show that even with the dramatically smaller portion of NVPE, 0.412% versus 2.6%, a stable emulsion was formed which also had a improvement in the Cement Mixing test, 0.02% versus 1.84%. The total emusifier quantity is also reduced from 3.0% to 1.0%. Thus it can be seen that the emulsifier composition of the present invention permits a stable emulsion to be formed with much lower emulsifier quantities.

Table 1B may also be read in conjunction with Tables 2, 3 and 4 below for similar comparisons with other examples of this invention. In each of these examples lower quantities of PPS result in stable emulsions with the emulsifier compositions of this invention.

EXAMPLE 2

Q/CPE with Surfactant Mixture—0.8% emulsifier

The Q/CPE portion totals 0.410% of the emulsion, about the same as in Example 1, but the surfactant solids portion is reduced to 0.390% for a total emulsifier solids content of 0.8% of the final emulsion, as shown in Table 2 below. The emulsion is prepared as described above. The ratio of Marasperse to Surfonic NB-557 solids is approximately 0.54:1. The total soap solution is about 37.5% and the asphalt is 61.6% of the total emulsion.

TABLE 2

Example 2 (Q/CPE with Surfactant Mixture - 0.8% emulsifier)

| Emulsion Components | Indulin SA-L | Example 2 |
|---|---|---|
| Indulin SA-L Solids[a] | 1.0% | |
| Marasperse N-22 | | 0.136% |
| Surfonic NB-557 Solids[b] | | 0.254% |
| Refined Quebracho | | 0.102% |
| Sweet Chestnut A | | 0.308% |
| Total Emulsifier Solids | 1.0% | 0.800% |
| NaOH | | 0.065% |
| Water | 36.2% | 37.535% |
| Total "Soap" Solution | 37.2% | 38.400% |
| Asphalt | 62.8% | 61.600% |
| Total Emulsion | 100% | 100% |

TABLE 2-continued

| Example 2 (Q/CPE with Surfactant Mixture - 0.8% emulsifier) | | | |
|---|---|---|---|
| Tests and Specifications | ASTM D977 | Emulsion Results | |
| Avg. Residue % | 57% min | 62.8%% | 61.60% |
| Cement Mixing % | 2.00% max | 0.29% | 0.03% |
| Sieve Test, % | 0.10% max | 0.01% | 0.01% |
| 24 Hour Stability, % | 1.0% max | 0.22% | 0.55% |
| Viscosity @ 25 C., SFS | 20 to 100 | 39 | 32 |
| Final pH of soap solution | | 10.60 | 10.03 |

[a]2.5% as aqueous solution.
[b]0.364% as aqueous solution.

The test results show a cement mixing of 0.03% contrasted with 0.29% for the Indulin reference. Although the 24 hour stability is somewhat better for the Indulin, 0.22% vesus 0.55%, the value is well within ASTM specification. Example 2 shows good results for Cement Mixing but not as good as the preferred Example 1 for 24 hour Stability.

EXAMPLE 3

Phenol-Formaldehyde (PF) Resin with Surfactant Mixture

The PF solids portion totals 0.340% of the emulsion and the surfactant solids total 0.580% for a total emulsifier solids content of 0.920% of the final emulsion, as shown in Table 3 below. The emulsion is prepared as described above. The ratio of Marasperse to Surfonic NB-557 solids is higher than in the previous examples, approximately 1.07:1. The total soap solution is 37.2% and the asphalt is 62.8% of the total emulsion. No caustic is added, and the final pH is 10.3.

TABLE 3

| Example 3 (PF Resin with Surfactant Mixture) | | |
|---|---|---|
| Emulsion Components | Indulin SA-L | Example 3 |
| Indulin SA-L Solids[a] | 1.0% | |
| Marasperse N-22 | | 0.30% |
| Surfonic NB-557 Solids[b] | | 0.28% |
| GP 6777 PF Resin Solids[c] | | 0.34% |
| Total Emulsifier Solids | 1.0% | 0.92% |
| NaOH | | |
| Water | 36.2% | 36.28% |
| Total "Soap" Solution | 37.2% | 37.20% |
| Asphalt | 62.8% | 62.80% |
| Total Emulsion | 100% | 100% |
| Tests and Specifications | ASTM D977 | Emulsion Results |
| Avg. Residue % | 57% min | 62.8%% | 62.40% |
| Cement Mixing % | 2.00% max | 0.29% | 0.07% |
| Sieve Test, % | 0.10% max | 0.01% | 0.03% |
| 24 Hour Stability, % | 1.0% max | 0.22% | -0.10% |
| Viscosity @ 25 C., SFS | 20 to 100 | 39 | 52 |
| Final pH of soap solution | | 10.60 | 10.35 |

[a]2.5% as aqueous solution.
[b]0.40% as aqueous solution.
[c]0.80% as aqueous solution.

The example test results show a cement mixing of 0.07% contrasted with 0.29% for the Indulin reference. The 24 hour stability is also better; −0.10 versus 0.22%. This example shows that the PF resin, even when used in smaller quantities than the NVPE, is also effective in producing a stable slow-setting emulsion.

EXAMPLE 4

Novolak Resin with Surfactant Mixture

The Novolak solids portion totals 0.512% of the emulsion and the surfactant solids total 0.488% for a total emulsifier solids content of 1% of the final emulsion, as shown in Table 4 below. The ratio of Marasperse to Surfonic NB-557 solids is approximately 0.53:1. The total soap solution is about 36.0% and the asphalt is 62.8% of the total emulsion.

The emulsion is prepared as described above, except that the pH is controlled during preparation and mixing of the soap solution to prevent premature re-precipitation of the Novolak resin. The pH is maintained at 12 or above during preparation by adding caustic. NaOH is 0.175% of the final emulsion, and the final pH is 12.01.

TABLE 4

| Example 4 (Novolak Resin with Surfactant Mixture) | | |
|---|---|---|
| Emulsion Components | Indulin SA-L | Novalak |
| Indulin SA-L Solids[a] | 1.0% | |
| Marasperse N-22 | | 0.170% |
| Surfonic NB-557 Solids[b] | | 0.318% |
| GP Novolak Resin Solids[c] | | 0.512% |
| Total Emulsifier Solids | 1.0% | 1.000% |
| NaOH | | 0.175% |
| Water | 36.2% | 35.880% |
| Total "Soap" Solution | 37.2% | 36.025% |
| Asphalt | 62.8% | 62.800% |
| Total Emulsion | 100% | 100% |
| Tests and Specifications | ASTM D977 | Emulsion Results |
| Avg. Residue % | 57% min | 62.8%% | 62.80% |
| Cement Mixing % | 2.00% max | 0.29% | 0.49% |
| Sieve Test, % | 0.10% max | 0.01% | 0.00% |
| 24 Hour Stability, % | 1.0% max | 0.22% | 0.10% |
| Viscosity @ 25 C., SFS | 20 to 100 | 39 | 78 |
| Final pH of soap solution | | 10.60 | 12.01 |

[a]2.5% as aqueous solution.
[b]0.455% as aqueous solution.
[c]1.280% as aqueous solution.

The test results show a cement mixing of 0.49%, and the 24 hour stability is 0.10%. The Cement Mixing is not as good as Examples 1–3, although it is within ASTM specifications. However, the Novolak resin is effective in producing a stable slow-setting emulsion. As noted above, the Novolak has better shelf life properties as compared with conventional PF resin.

EXAMPLE 5

Working Example of Preparation of Emulsion with Borate

Sodium borate decahydrate can be added to the emulsifier solution of any one of Examples 1–4 above by simply mixing with the water or with the soap solution in amounts in the range of from about 0.02% to about 2.00% w/w before milling with asphalt. The resulting emulsifier including borate exhibits improved stability.

INDUSTRIAL APPLICABILITY

It will be evident that the asphalt emulsifier compositions of the invention, in requiring less NVPE or SPR, have greater flexibility, economy and versatility of manufacture than those of the prior art, while still permitting the formation of a stable slow-setting asphalt emulsion suitable for pavement sealing and coating. It is quite simply a better emulsion than Indulin-bases emulsions. In addition the compositions of the invention provide effective synthesized substitutes for NVPE, increasing market flexibility and reliability.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. An asphalt emulsion comprising:
   a) from about 60% to about 20% by weight of an emulsifying composition as in claim 1 as the dispersion phase; and
   b) from about 40% to about 80% by weight asphalt suspended therein as finely dispersed particles as the dispersed phase of said emulsion.

2. An asphalt emulsion as in claim 1, wherein said polyphenolic substance is a mixture of about 25% Quebracho and about 75% Chestnut A.

3. An asphalt emulsion as in claim 1, wherein the ratio of said nonionic to anionic surfactants range from about 1:4 to about 4:1.

4. An asphalt emulsion as in claim 1, which includes about 0.02% to about 2.00% w/w of sodium borate decahydrate.

* * * * *

UNITED STATES PATENT AND TRADEMARK OFFICE
CERTIFICATE OF CORRECTION

PATENT NO.    : 6,103,000
DATED         : August 15, 2000
INVENTOR(S)   : Robert S. Custer It is certified that error appears in the above-identified patent and that said Letters Patent is hereby corrected as shown below:

<u>Column 14,</u>
Lines 2 - 9, Claim 1 is corrected to read as follows:

1. An asphalt emulsion comprising:
   a) from about 60% to about 20% by weight of an emulsifying composition as the dispersion phase comprising:
       (i) about 0.1% to about 10.0% by dry weight of a polyphenolic substance selected from the group consisting essentially of Chestnut A, Chestnut N, Sumac-K10, phenol-formaldehyde resins, resorcinol-formaldehyde resins, novolak resins and mixtures thereof;
       (ii) about 0.1% to about 3.0% by active weight of a surfactant comprising a mixture of a nonionic surfactant with a hydrophilic/lipophilic balance index of from about 16 to about 20, and an anionic lignin sulfonate;
       (iii) said polyphenolic substance and said surfactant components are dissolved in water as a continuous phase, said water is present in an amount to make up 100% by weight; and
       (iv) an alkali sufficient to adjust the pH of the emulsifying solution to a value in the range of about 4.5 to about 12.5; and
   b) from about 40% to about 80% by weight asphalt suspended therein as finely dispersed particles as the dispersed phase of said emulsion.

Signed and Sealed this

Fourth Day of February, 2003

JAMES E. ROGAN
*Director of the United States Patent and Trademark Office*